US006477578B1

(12) United States Patent
Mhoon

(10) Patent No.: US 6,477,578 B1
(45) Date of Patent: Nov. 5, 2002

(54) SYSTEM AND METHOD FOR CONDUCTING SECURE INTERNET TRANSACTIONS

(76) Inventor: Hankey Mhoon, 7533 Keystone Ave., Skokie, IL (US) 60076

(*) Notice: Subject to any disclaimer, the term of this patent is extended or adjusted under 35 U.S.C. 154(b) by 0 days.

(21) Appl. No.: 09/208,943

(22) Filed: Dec. 10, 1998

Related U.S. Application Data

(60) Provisional application No. 60/069,740, filed on Dec. 16, 1997.

(51) Int. Cl.[7] .............................................. G06F 15/16
(52) U.S. Cl. ....................... 709/229; 709/219; 709/225; 709/227; 709/228; 709/239; 705/1; 705/38; 705/39; 705/44
(58) Field of Search ................................. 709/225, 219, 709/227, 228, 229, 239; 705/1, 8, 34, 35, 42, 44, 27, 38, 39

(56) References Cited

U.S. PATENT DOCUMENTS

| | | | | |
|---|---|---|---|---|
| 4,799,156 A | * | 1/1989 | Shavit et al. ................. 705/26 |
| 5,351,296 A | | 9/1994 | Sullivan ....................... 380/24 |
| 5,371,797 A | | 12/1994 | Bocinsky, Jr. ................ 380/24 |
| 5,475,585 A | * | 12/1995 | Bush ............................. 705/26 |
| 5,485,370 A | * | 1/1996 | Moss et al. ................ 709/21 K |
| 5,511,122 A | | 4/1996 | Atkinson ...................... 280/25 |
| 5,528,490 A | * | 6/1996 | Hill ............................. 395/712 |
| 5,590,197 A | | 12/1996 | Chen et al. .................... 380/24 |
| 5,671,279 A | | 9/1997 | Elgamal ....................... 380/23 |
| 5,671,285 A | | 9/1997 | Newman ...................... 380/30 |
| 5,689,799 A | * | 11/1997 | Dougherty et al. ............. 455/2 |
| 5,699,528 A | * | 12/1997 | Hogan ........................... 705/40 |
| 5,715,399 A | | 2/1998 | Bezos ........................ 395/227 |
| 5,727,163 A | * | 3/1998 | Bezos ........................... 705/27 |
| 5,729,594 A | * | 3/1998 | Klingman .................. 379/93.12 |
| 5,790,677 A | * | 8/1998 | Fox et al. ...................... 380/24 |
| 5,799,285 A | * | 8/1998 | Klingman .................... 705/26 |
| 5,809,143 A | * | 9/1998 | Hughes ......................... 380/24 |
| 5,809,144 A | * | 9/1998 | Sirbu et al. ................... 380/25 |
| 5,822,737 A | * | 10/1998 | Ogram ......................... 705/26 |
| 5,826,245 A | * | 10/1998 | Sandberg-Diment ......... 705/44 |
| 5,845,070 A | * | 12/1998 | Ikudome ..................... 713/201 |
| 5,881,226 A | * | 3/1999 | Veneklase ................... 713/202 |
| 5,945,653 A | * | 8/1999 | Walker et al. .............. 235/380 |
| 5,983,208 A | * | 11/1999 | Haller et al. ................. 705/40 |
| 5,987,140 A | * | 11/1999 | Rowney et al. .............. 380/49 |
| 6,012,144 A | * | 1/2000 | Pickett ........................ 713/201 |
| 6,014,636 A | * | 1/2000 | Reeder ......................... 705/17 |
| 6,058,250 A | * | 5/2000 | Harwood et al. ...... 395/200.57 |
| 6,175,823 B1 | * | 1/2001 | Van Dusen .................. 705/26 |
| 6,327,348 B1 | * | 12/2001 | Walker et al. ........... 379/91.01 |

OTHER PUBLICATIONS

Computer Patent Search, 5 pages, dated Feb. 11, 1998.

* cited by examiner

Primary Examiner—Saleh Najjar
(74) Attorney, Agent, or Firm—Marshall, Gerstein & Borun.

(57) ABSTRACT

A system and method for conducting secure electronic transactions via the Internet uses a second secure communication link for the transmission of sensitive information. Transactions are split so that non-sensitive information is transmitted to a merchant's computer via the Internet and sensitive information is transmitted to a third party processing center, as needed, on a second secure communication link that uses switched telephone circuits. The third party processing center provides authorization codes to the customer, via the secure link, that are used to complete purchase transactions with the merchant via the Internet link. Transactions are conducted so that the merchant never receives sensitive customer information.

16 Claims, 6 Drawing Sheets

SYSTEM AND METHOD FOR CONDUCTING SECURE INTERNET TRANSACTIONS

STATEMENT OF RELATED APPLICATION

This application claims the benefit of the filing date of provisional patent application U.S. Serial No. 60/069,740 entitled "Dual Communicating Device and Multi-Point Split-Processing Method for Secure Internet Transactions," which was filed on Dec. 16, 1997 and which is incorporated herein by reference in its entirety.

BACKGROUND OF THE INVENTION (a) Field of the Invention

The present invention relates generally to a system and method for conducting secure electronic commercial transactions via the Internet. More particularly, it relates to a system and method that splits these transactions so that non-sensitive information is transmitted via the Internet and sensitive information, such as credit/debit card and financial account numbers, is transmitted via a second secure communication link.

(b) Description of Related Art

The explosive growth of electronic commerce conducted through the Internet has increased the need for systems and methods that can conduct these transactions with increased security. The Internet is essentially a network of networks that is readily accessible to the public and allows users to view and retrieve information on an international scale by browsing, for example, what is commonly referred to as the world-wide-web. Of particular concern are the unauthorized personnel or "hackers" that intercept credit card numbers on the Internet and commit thefts by using these numbers to make purchases without the card owner's authorization.

A variety of known encryption schemes have been used to increase the security of Internet transactions. Unfortunately, hackers have quickly evolved their decryption techniques, thereby significantly diminishing the protection provided by these known encryption techniques. Thus, even if encryption is used, consumers take a significant risk when they transmit sensitive information such as credit/debit card numbers, bank account numbers, and personal identification numbers (PINs) via the Internet.

Another known approach that increases the security of Internet transactions assigns each user a unique electronic signature. With this approach, transactions containing sensitive information must be accompanied by this signature for the transaction to be considered valid. This approach is typically used with encryption to protect the contents of transactions and the signature from hackers. As with the general encryption techniques described above, the user still takes a substantial risk when transmitting sensitive information using this technique because hackers may be able to decipher and/or duplicate the user's signature for use in unauthorized transactions.

In yet another known approach, Internet transactions are conducted by initiating a transaction via the Internet and completing the transaction by having a consumer transmit sensitive information directly to a merchant either via facsimile or by making a phone call and verbally conveying the information to the merchant. Although this approach improves security by completely eliminating the transfer of any sensitive information on the Internet, it significantly diminishes the convenience that electronic shopping and banking are intended to provide.

All of the aforementioned approaches to improving the security of commercial transactions on the Internet are undesirable because they transmit sensitive customer information to merchants. As a result, customers and credit corporations remain unprotected from unscrupulous merchants that may use credit card numbers to carry out fraudulent purchases without the customer's consent. In addition, in the process of authorizing credit purchases, merchants may pass transaction information related to a customer's purchasing habits, such as items purchased and associated purchase amounts, to credit clearing houses that sell this information to direct marketing services, which may be undesirable for many customers.

Thus, there is a need for a system and method for conducting electronic commercial transactions via the Internet that improves security, minimizes the unnecessary transmission of information regarding customers' purchase preferences, and that maintains the high level of convenience and efficiency demanded by electronic shoppers.

SUMMARY OF THE INVENTION

The present invention provides a system and method for conducting electronic commercial transactions via the Internet. The system uses two communication links and a split transaction scheme to significantly increase security without sacrificing convenience to the customer. The customer's computer may utilize a conventional Internet link to browse various web pages and to initiate transactions with a business. The customer may transmit and receive non-sensitive information via the Internet. A second secure link is established with the customer's computer, as needed, to transmit sensitive information for credit authorization processing and/or customer verification purposes. Thus, with the present invention, sensitive information, such as credit card numbers, financial account numbers, and PINs are never transmitted across the Internet, thereby preventing potential hackers from having access to it.

In accordance with one aspect of the present invention, a first communication link between a first computer and a second computer is established on the Internet. Non-sensitive information associated with a transaction is generated based on user inputs and other information derived from the Internet. At least some of the nonsensitive information is sent from the first computer to the second computer via the Internet. A second, secure communication link is established between the first computer and a third computer. Some of the non-sensitive information is sent, together with the sensitive information, to the third computer via the secure link. The third computer system then processes some of the sensitive information and some of the non-sensitive information to produce authorization information, which is subsequently sent to one of the first and second computers via one of the first and second communication links.

In some embodiments, the first computer may be associated with a customer, the second computer may be associated with a merchant, and the third computer may be associated with a credit processing center.

In other embodiments, the first communication link may be idled. The second communication link may then be terminated, and the first communication link may then be reactivated.

In accordance with another aspect of the present invention, a customer computer is programmed to allow a customer to conduct a commercial transaction on the Internet A communication module associated with the customer computer is adapted to communication the Internet. The customer computer is further programmed to receive customer inputs and webpage information and to exchange non-sensitive information with a merchant computer that is also in communication with the Internet. The customer computer is further programmed to cause the communication module to establish a second, secure communication link to a credit computer associated with a credit organization.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
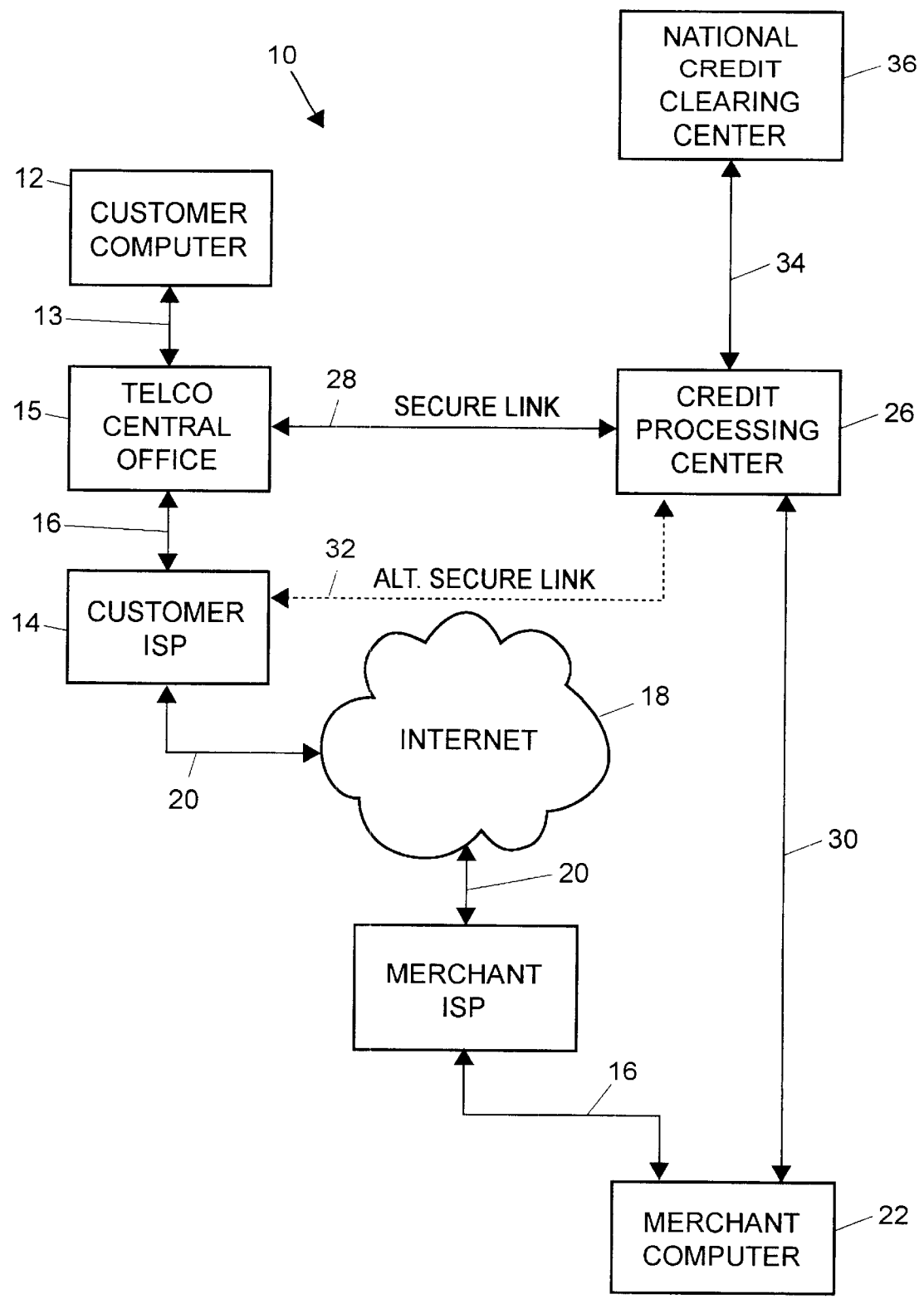
FIG. 1 illustrates a block diagram of system configuration that is preferably used to conduct on-line shopping transactions in accordance with the present invention.

Illustrated in FIG. 1 is a preferred system configuration 10 for conducting on-line shopping transactions in accordance with the present invention. A customer computer 12 is connected to an Internet service provider (ISP) 14 through phone lines 13 and a local telecommunications (TELCO) central office or switching station 15 to a public switched telephone network (PSTN) 16. As is commonly known, the computer may include one or more modems within a modem module 41(shown in FIG. 2) to communicate with the TELCO central office 15 and the various telephone circuits of the PSTN 16. The phone lines/circuits may include conventional bandwidth lines and high bandwidth lines such as integrated services digital network (ISDN) lines, which are commonly known. The customer ISP 14 communicates with the Internet 18 through a conventional packet switching network connection 20 (e.g., TCP/IP). Thus, the customer's computer 12 can access in a conventional manner various web pages and other information on the Internet 18. A merchant's computer 22 is similarly in communication with the Internet 18 through a merchant ISP 24.

The system 10 includes a third party credit processing center 26 that preferably performs credit authorizations for the customer and funds transfers for the merchant. The credit processing center 26 communicates with the customer computer 12 via a secure link 28, which is preferably a PSTN circuit connection. This PSTN circuit connection 28 is secure because it is essentially a point-to-point hardware connection that is not readily accessible to the public. The credit processing center 26 also communicates with the merchant computer 22 via lines 30, which may, for example, be telephone lines. The system 10 may also include a national credit clearing center 36 that is in communication with the credit processing center 26 via telephone lines 34.

The secure link between the customer's computer 12 and the credit processing center 26 may be implemented using one of several possible configurations. In a first configuration, the secure link 28 may be established by utilizing a second modem of the modem module 41 (FIG. 2) and directly linking this second modem through phone lines 13 and the TELCO central office 15 to the credit processing center 26. In a second configuration, a single modem may be used to establish the secure link 28 to the credit processing center 26 through a conference calling function available from the customer's TELCO central office 15. In this second configuration, the conference calling function switches a single modem output from the customer's computer 12 so that the modem can communicate, as needed, across either the Internet 18 through the ISP 14 or to the credit processing center 26 across the secure link 28. In a third configuration, a secure link 32 may be established between the customer's ISP 14 and the credit processing center 26. In this third configuration, the customer's ISP 14 includes a remotely outbound dialing server module that provides the switching hardware necessary to route a single modem output from the customer's computer 12 to either the credit processing center 26, via the secure link 32, or to the Internet 18 via the switching packet network 20.

Those skilled in the art will appreciate that the choice of configurations for the secure communication links 28, 32 will depend on the customer's computer hardware/software, the availability of a conferencing feature at the customer's local telephone circuit switching station, and the hardware/software available at the customer's ISP 14. In all three configurations, it is preferred that the secure communication links 28, 32 between the customer's computer 12 and the credit processing center 26 are established on a telephone switching circuit such as a conventional PSTN, for example.

Figure 2:
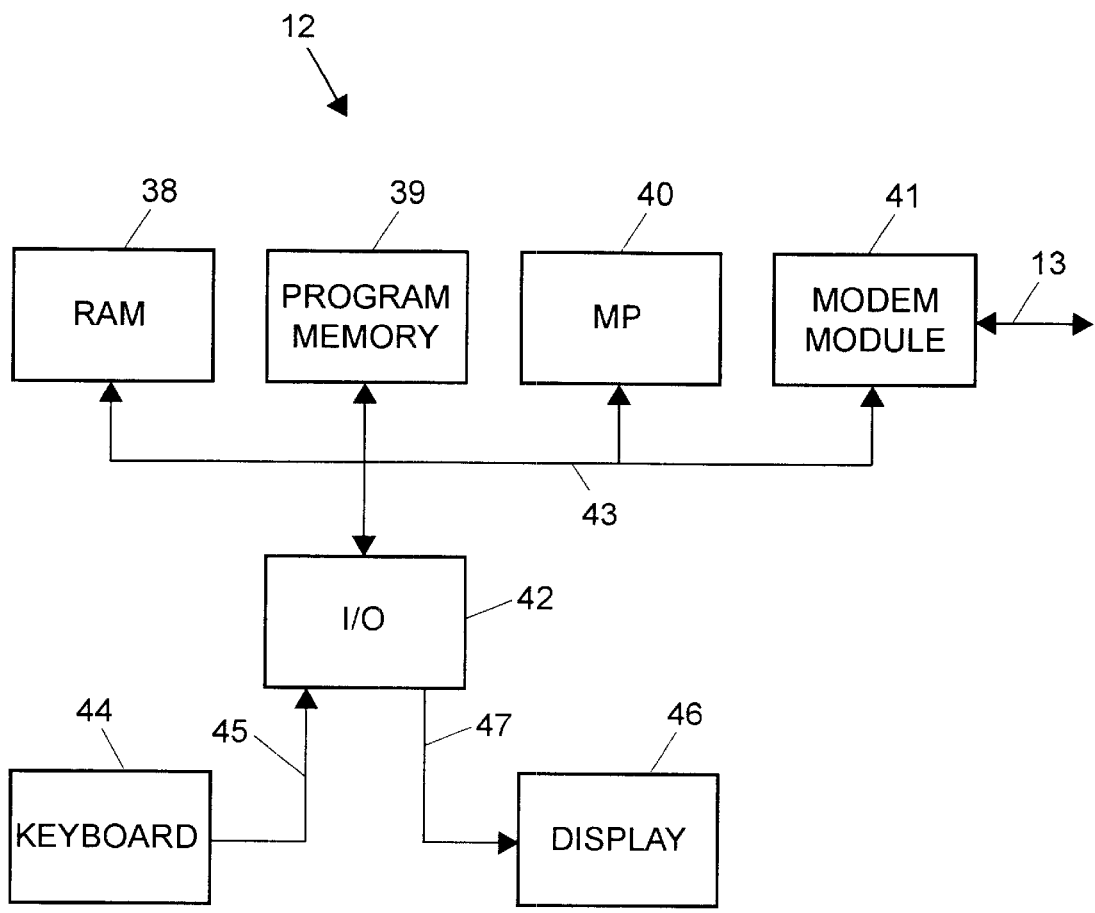
FIG. 2 illustrates a block diagram of one possible computer architecture for the customer computer used with the system of FIG. 1.

The customer's computer 12 is preferably a conventional computer system, such as a personal computer. FIG. 2 illustrates one possible computer architecture suitable for implementing various aspects of the present invention. The customer's computer 12 includes a random access memory (RAM) 38, a program memory 39, which may be a read only memory (ROM), a microprocessor (MP) 40, a modem module 41, which may incorporate the capability of supporting one or more analog and/or digital communication channels or links, and an input/output (I/O) circuit 42, all of which are interconnected by an address/data bus 43. A keyboard 44 is connected to the I/O circuit 42 via a line 45 for entering data and commands into the computer system 12, and a visual display 46, such as a CRT, is connected to receive data via a line 47 to generate visual displays of data generated during the operation of the computer system 12.

The program memory 39 electronically stores a computer program or programs, executed by the microprocessor 40, that may implement various aspects of the present invention. For example, the customer's computer 12, may include conventional Internet browser software (e.g., Netscape Navigator™ or Microsoft Explorer™) that enables the customer to access and interact with webpages and other information that may be provided by the merchant's computer 22. This interaction may, for example, be an on-line shopping transaction between the customer and the merchant. The customer may select and confirm items for purchase using the various webpages provided by the merchant's website. Also, for example, the customer's computer 12 may include other programs, such as a graphical interface having pop-up menus, graphics, and textual displays that facilitate the customer's interaction with the system 10, and control programs that perform the various handshaking, control, and other data transmission/processing functions necessary to implement the present invention. The customer's computer 12 may further cooperate with other programs that are locally stored and executed at the merchant's computer 22 and the credit processing center 26.

Those skilled in the art will recognize that the various processing steps of the methods discussed in detail below may be implemented using a wide variety of conventional hardware and software techniques. It will also be understood that some of the steps described in the methods below may be performed manually or without the use of the computer system 12.

In operation of the system 10 shown in FIG. 1, sensitive information is only transmitted to and from the credit processing center 26 on the secure links 28, 32. Purchase transactions are split so that the non-sensitive aspects of the transaction are conducted across the conventional unsecure Internet connections 20, and the sensitive aspects of the transaction are conducted across the secure links 28, 32. Accordingly, sensitive customer information such as credit/debit card numbers and PINs are only communicated on the secure links 28, 32 between the customer's computer 12 and the credit processing center 26. Additionally, the customer's computer receives credit authorization information from the credit processing center 26 via the secure links 28, 32.

Thus, the configuration of the system 10 substantially increases the security of Internet purchase transactions in several ways. First, sensitive customer information is only transmitted, as needed, on secure communication links 28, 32 to the credit processing center 26. Second, the merchant and the customer interact exclusively through the Internet 18, and the merchant does not receive any sensitive customer information either directly from the customer or indirectly from the credit processing center 26. This prevents an unscrupulous merchant from making additional credit purchases without a customer's authorization. Third, the credit processing center 26 does not receive any unnecessary non-sensitive transaction information such as the identity of purchased items. This prevents the credit processing center 26 from subsequently selling information on the customer's purchasing habits to direct marketing services.

Figure 3:
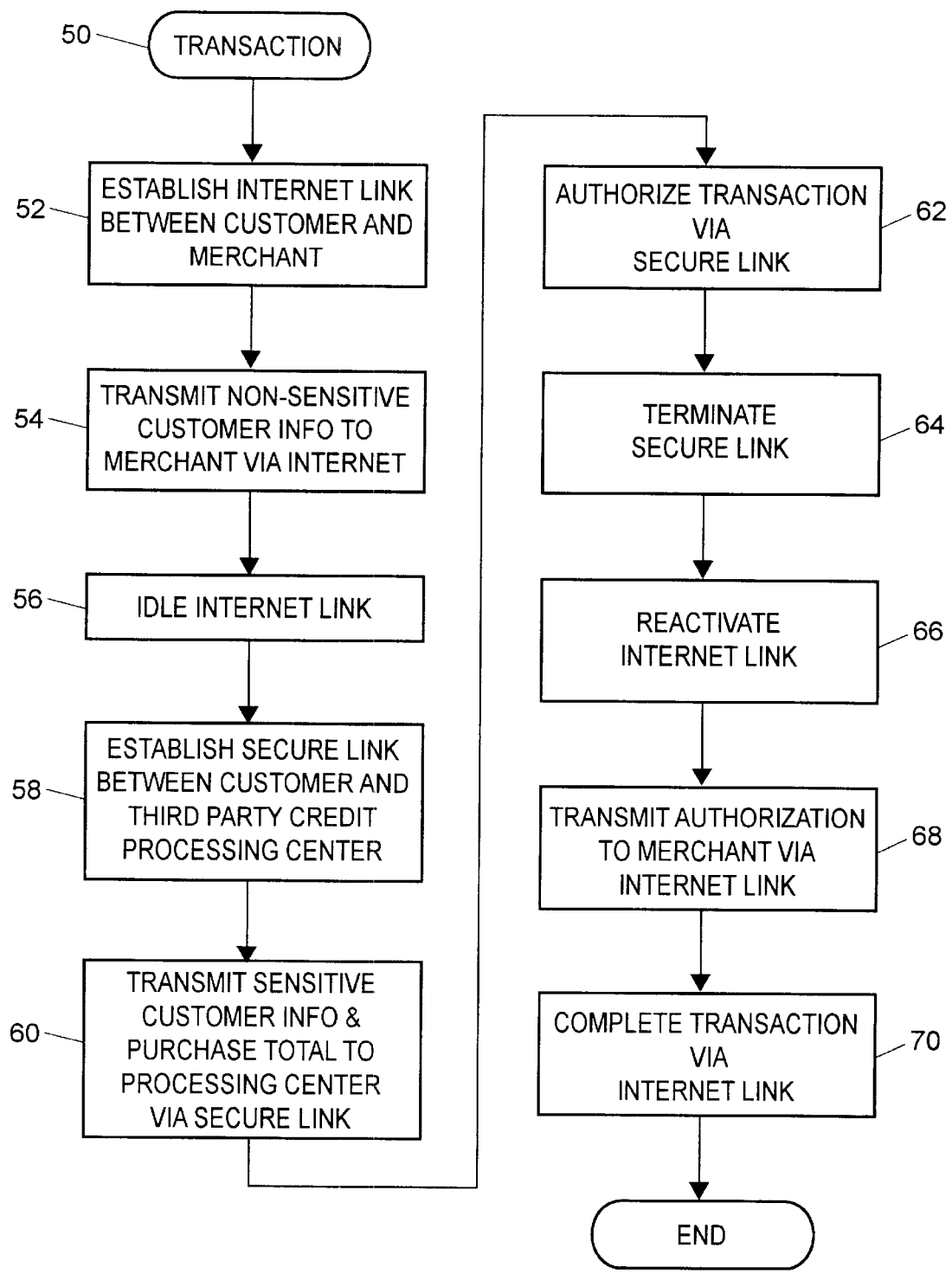
FIG. 3 is a flow diagram representing a commercial transaction in accordance with the present invention.

FIG. 3 illustrates a flow diagram of a transaction routine 50 for conducting an on-line shopping transaction within the system 10 shown in FIG. 1. In step 52, the customer's computer 12 utilizes its modem module 41 to connect via the phone lines 13 to the TELCO central office 15. The TELCO central office 15 routes the modem signals to the customer's ISP 14, which establishes a conventional connection with the Internet 18 through the packet switching network 20. The customer then uses conventional browsing software and techniques to locate a webpage associated with making purchases from a particular merchant. In step 54, the customer enters non-sensitive transaction information such as name, address, phone number, items to be purchased, etc., confirms the information, and then transmits the non-sensitive transaction information to the merchant's computer 22 via the Internet 18. In step 56, the customer's computer 12 puts the Internet connection into a standby or idle condition and, in step 58, establishes a second secure communication link 28, 32 to the credit processing center 26. This second communication link 28, 32 may be established using any one of the above described secure link configurations; namely, a connection using a second modem in the customer's computer 12, a connection using a conference calling function available from the customer's TELCO central office 15, or a connection using an available switching function within the customer's ISP 14. In step 60, the customer's computer 12 transmits, via one of the secure communication links 28, 32, sensitive customer information such as a credit account number and PIN (if needed) together with relevant non-sensitive information, such as total purchase amount, to the credit processing center 26. In step 62, the credit processing center 26 processes the sensitive customer information together with the purchase amount to generate an authorization code for the transaction and then transmits this authorization code to the customer's computer 12 via one of the secure links 28, 32. In step 64, the customer's computer 12 terminates the secure link 28, 32 and, in step 66, reactivates the idling Internet connection. In step 68, the customer's computer 12, transmits the complete purchase order, together with the authorization code, to the merchant's computer 22 via the Internet 18. In step 70, the customer begins a new purchase cycle on the current webpage, or resumes conventional Internet browsing or other information retrieval functions.

Figure 4:
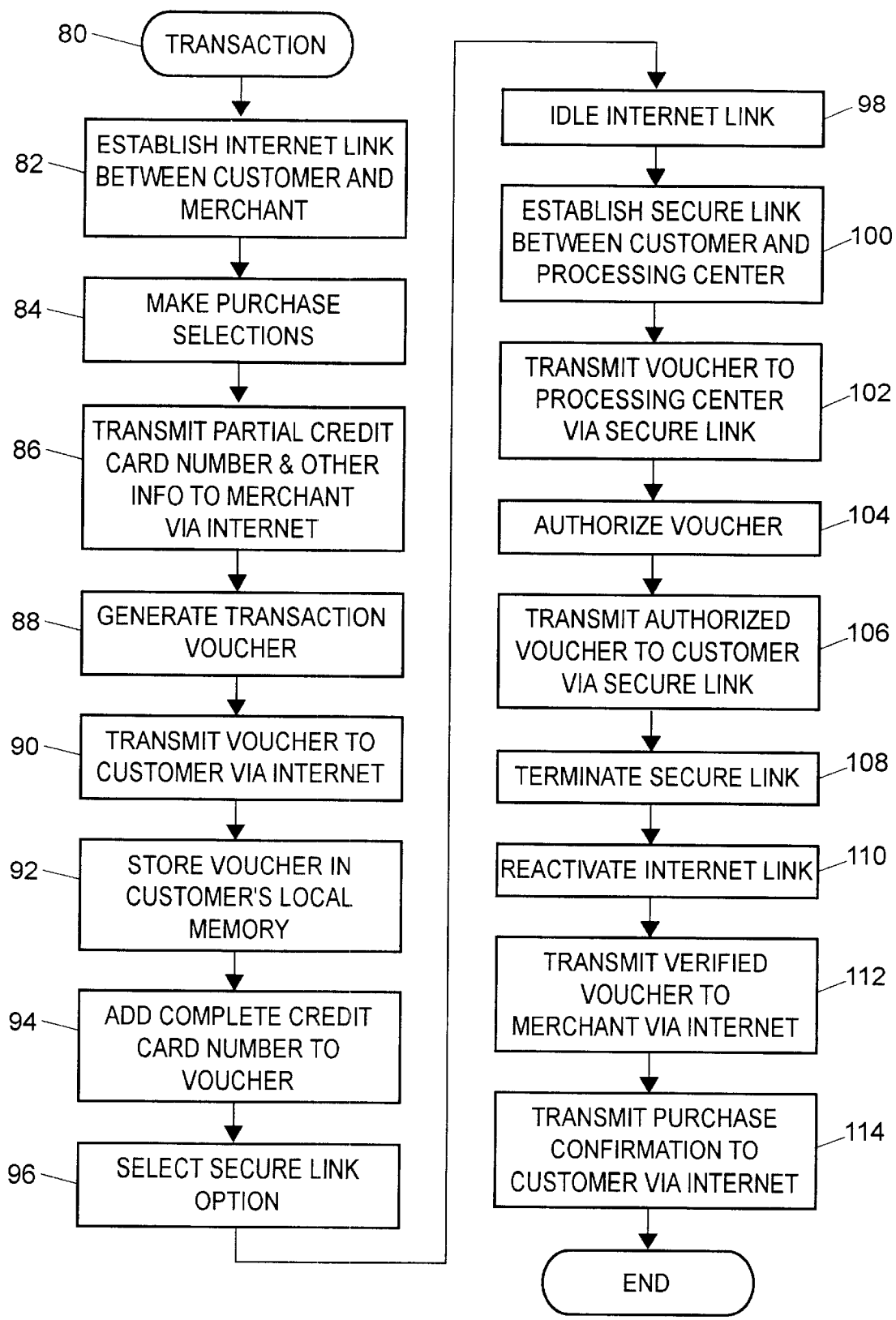
FIG. 4 is a flow diagram representing a more detailed example of a commercial transaction in accordance with the present invention.

Illustrated in FIG. 4 is a more detailed example of a transaction routine 80 for conducting on-line shopping transactions in accordance with the present invention. In step 82, an Internet connection is established with the customer's computer 12. In step 84, the customer makes purchase selections from a merchant's webpage. In step 86 through step 96, a variety of non-sensitive information is transmitted between the customer's computer 12 and the merchant's computer 22. In step 86, the customer's computer 12 transmits name, address, credit provider name, etc., along with a partial credit card account number that may, for example, consist of the first four digits of the account number. The first four digits of the credit account number may be used to facilitate subsequent credit clearing transactions between the merchant, the credit processing center 26, and the national credit clearing center 36. In step 88, the merchant's computer 22 generates a transaction voucher template that includes non-sensitive information previously provided by the customer and arranged in a format that may be preferred by the merchant. In step 90, the transaction voucher is transmitted to the customer's computer 12 via the Internet 18. In step 92, the customer's computer 12 stores the transaction voucher in a local non-volatile memory (e.g., the program memory 39 shown in FIG. 2). In step 94, the customer adds sensitive information, such as a complete credit account number and PIN (if needed), to the transaction voucher and in step 96, selects a secure link option for the subsequent transmission of the sensitive information. The aforementioned secure link configurations may be offered as choices depending on the availability of the required hardware/software. In step 98, the Internet link is placed into an idle condition, and in step 100, one of the secure links 28, 32 is established between the customer's computer 12 and the credit processing center 26.

In step 102, the customer's computer 12 transmits, across one of the secure links 28. 32, the completed voucher, which now includes sensitive information (e.g., a complete credit account number), to the credit processing center 26. In step 104, the credit processing center 26 processes the completed voucher and generates an authorization code. In step 106, the credit processing center 26 transmits the voucher together with the authorization code to the customer's computer 12 via one of the secure links 28,32. In step 108, the customer's computer 12 terminates the secure link 28, 32 and in step 110, reactivates the Internet link. In step 112, the customer's computer 12 transmits the authorized voucher, with the authorization code but without sensitive information, such as the complete credit account number, to the merchant's computer 22 via the Internet 18. In step 114, the merchant's computer 22 may transmit a purchase confirmation to the customer's computer 12, via the Internet 18, that can subsequently be stored in local memory of the customer's computer 12 for reference purposes.

For the transaction routines depicted in FIGS. 3 and 4, an authorization code is preferably transmitted from the credit processing center 26 to the customer's computer regardless of whether or not the requested credit amount is approved or denied. If the authorization code indicates a denial, then the transaction will be terminated without attempting to transmit, to the merchant's computer 22, the authorization code together with any associated purchase voucher. The authorization code may subsequently be used to facilitate funds transfers for the merchant at the end of a business cycle.

Figure 5:
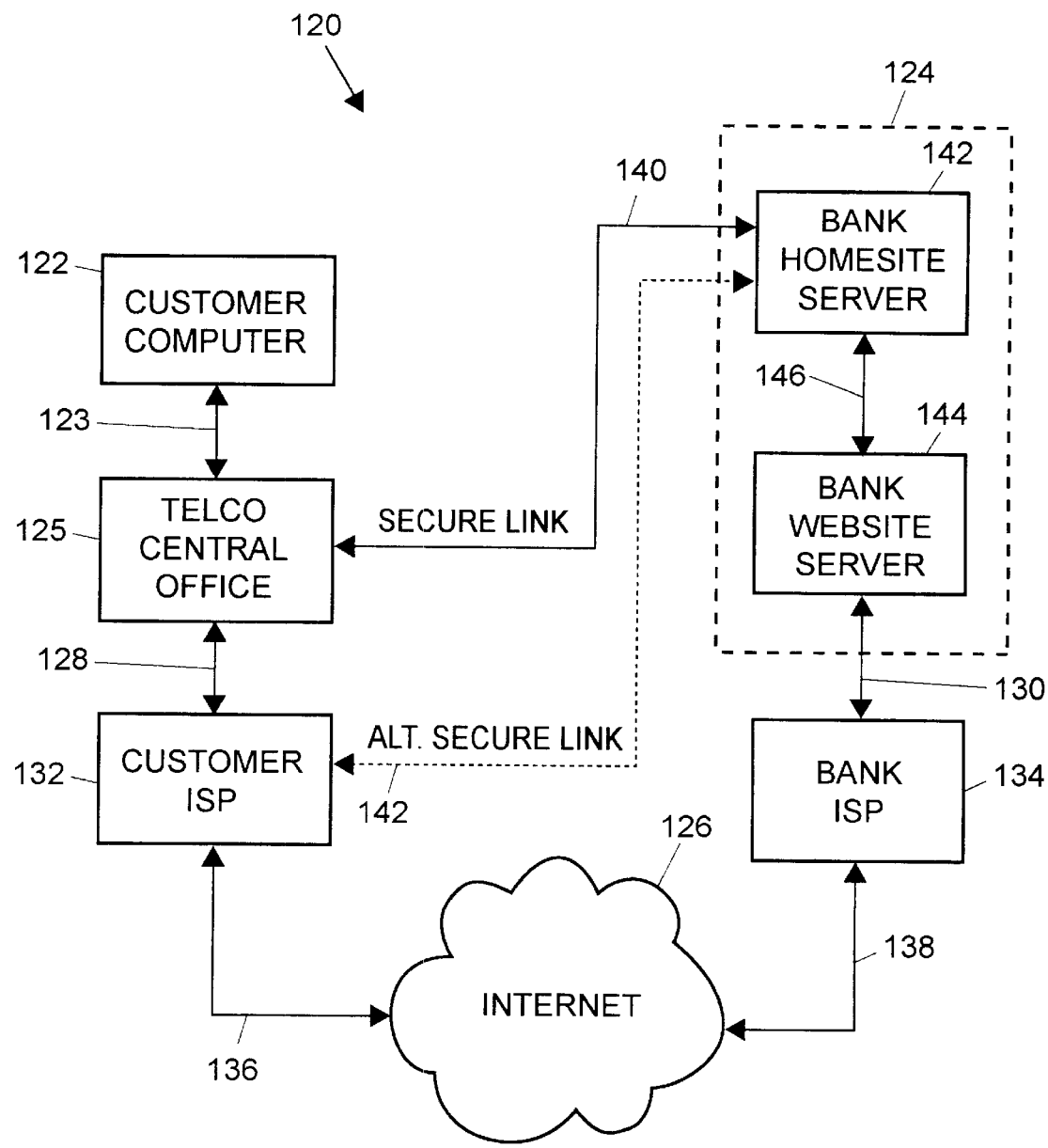
FIG. 5 illustrates a block diagram of another system configuration that is preferably used to conduct financial account transactions in accordance with the present invention.

Now turning to FIG. 5, an alternative system configuration 120 is shown that is preferably used to conduct on-line financial account transactions such as banking. A customer computer 122 is connected via phone lines 123 to a TELCO central office 125. The customer computer 122 and a bank computer 124 are connected to the Internet 126 via respective PSTNs 128, 130, ISPs 132, 134, and packet switching networks 136, 138 in a manner similar to the customer computer 12 and the merchant computer 22 shown in FIG. 1. The customer may interact with the bank's webpage via the Internet 126 using conventional browsing software and techniques. As with the previous configuration 10 disclosed in FIG. 1, the system configuration 120 includes one or more secure links 140, 142 that may be established to transmit sensitive information such as account numbers and PINs. In this configuration, a third party processing center is not needed because the customer's bank already retains the pertinent sensitive information.

As a further measure of protection from hackers, the bank computer 124 is preferably a bifurcated system having a secure homesite server 142 and a public access website server 144 that communicate across a firewall connection 146. As shown in the figure, the secure links 140, 142 are preferably in direct communication with the secure homesite server. Thus, with this bifrucated system architecture, hackers can only access the bank's website server 144 and are prevented from directly accessing the bank's homesite server 142 by the firewall 146.

Figure 6:
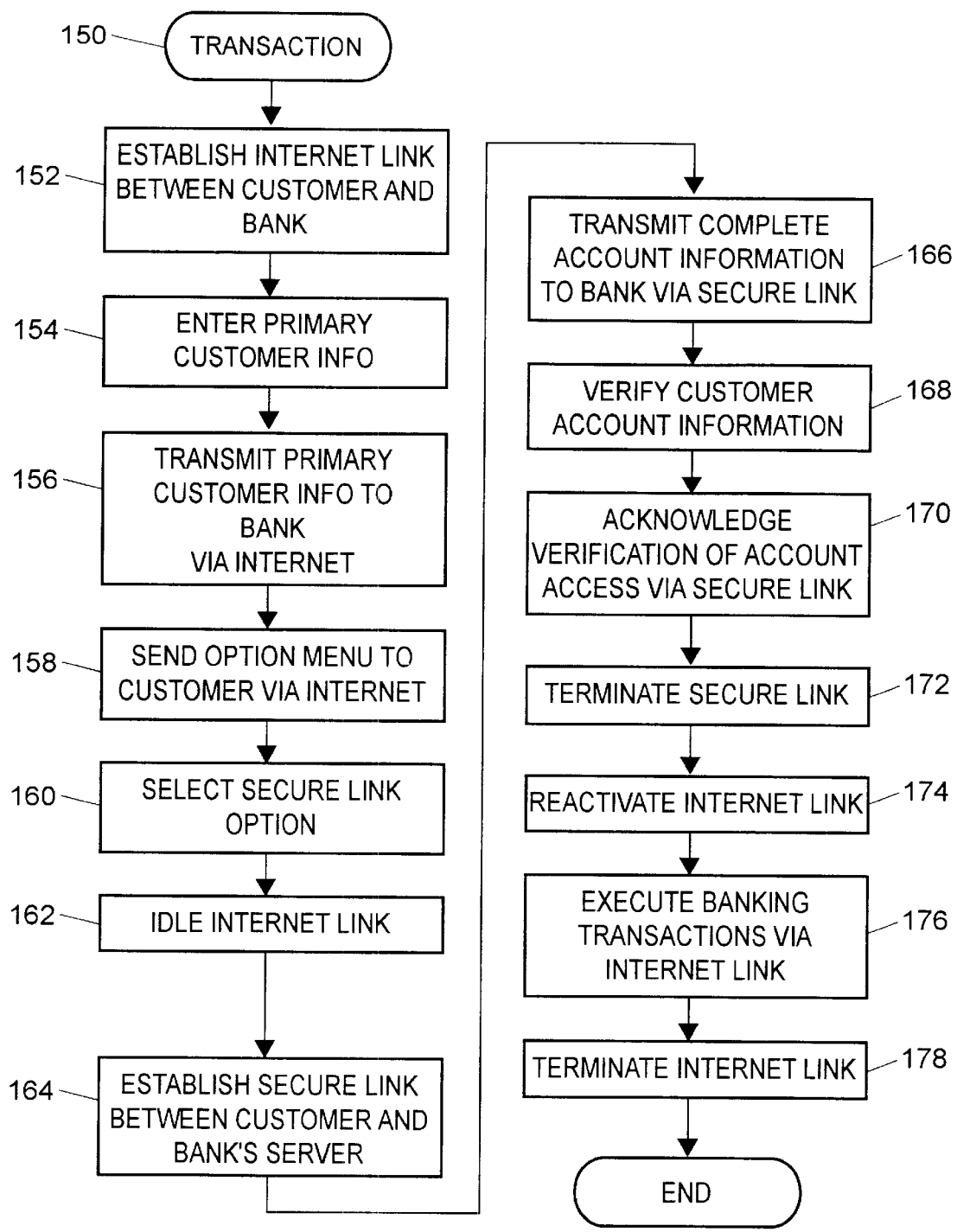
FIG. 6 is a flow diagram representing an example of a financial account transaction in accordance with the present invention.

Illustrated in FIG. 6 is a flow diagram that depicts an on-line banking transaction 150 that may be implemented in accordance with the present invention using the system 120 shown in FIG. 5. Instep 152, the customer's computer 122 establishes an Internet link to the bank's account management webpage via phone lines 123, TELCO central office 125, PSTN 128, customer ISP 132, and the packet switching network 136. In step 154, the customer enters non-sensitive account information such as name, address, etc. on the appropriate webpage. In step 156, the customer transmits the non-sensitive account information, via the Internet 126, to the bank's computer 124. In step 158 and step 160, the customer selects a transaction type and a secure link option (i.e., dual modem, ISP switching, or conference call switching) and transmits this information to the bank's computer 124 via the Internet 126. In step 162, the customer's computer 122 puts the Internet link into an idle condition and in step 164, establishes the selected one of the secure links 140,142 between the bank's computer 124 and the customer's computer 122. In step 166, the customer's computer 122 transmits sensitive account information, such as a complete account number and PIN (if needed) to the bank's computer 124 via one of the secure links 140, 142. In step 168, the bank's computer 124 processes and verifies the customer account information, and in step 170 sends a verification acknowledgment to the customer's computer 122 via one of the secure links 140, 142. In step 172, the customer's computer 122 terminates the secure link 140, 142 and in step 174 reactivates the Internet link. In step 176, the customer now has access to his accounts and may proceed with the planned banking transaction via the Internet 126. In step 178, the customer completes his transaction and may terminate the Internet link.

In summary, the above disclosed embodiments provide a secure system and method for conducting transactions on the Internet. Transactions are split so that sensitive information is transmitted via a secure connection, such as a switched telephone circuit, and non-sensitive information is transmitted in a conventional manner on the Internet. A high level of efficiency and convenience is achieved because the customer's computer conducts many non-sensitive information transfers via a conventional Internet connection and automatically activates the secure link on switched telephone circuits, as needed, to transmit sensitive customer information.

Of course, it should be understood that a range of changes and modifications can be made to the preferred embodiment described above. For example, the alternative system configuration 120 shown in FIG. 5 may also be used to conduct credit/charge account transactions between a customer's computer and a credit/charge provider's computer (where the credit/charge provider's computer replaces the bank's computer 124). It is therefore intended that the foregoing detailed description be regarded as illustrative rather than limiting and that it be understood that it is the following claims, including all equivalents, which are intended to define the scope of this invention.

What is claimed is:

1. A method of communicating electronic transaction information, comprising:

establishing a first communication link between a customer computer and a telephone network switching center;

establishing a second communication link between the telephone network switching center and a merchant computer via an internet service provider and an internet;

idling the second communication link;

establishing a third communication link between a credit processing center computer and one of the telephone network switching center and the internet service provider via a circuit switching network while the second communication link is idling;

determining whether the electronic transaction information is sensitive;

controlling a switching function within the one of the telephone network switching center and the internet service provider to send the electronic transaction information from the customer computer via the first communication link to the merchant computer via the second communication link if the electronic transaction information is not sensitive; and controlling the switching function within the one of the telephone network switching center and the internet service provider to send the electronic transaction information from the customer computer via the first communication link to the credit processing center computer via the third communication link if the electronic transaction information is sensitive.

2. The method of claim 1, wherein determining whether the electronic transaction information is sensitive includes determining whether the electronic transaction information is one of credit/debit card information and account access information.

3. The method of claim 1, wherein controlling the switching function within the one of the telephone network switching center and the internet service provider includes controlling one of a conference calling function and an outbound dialing server switching function.

4. The method of claim 1, wherein establishing the first communication link between the customer computer and the telephone network switching center includes using a modem within the customer computer to establish the first communication link.

5. The method of claim 1, further including establishing a fourth communication link between the credit processing center computer and a national credit clearing center computer.

6. A system for communicating electronic transaction information, comprising:
- a computer readable medium; and
- software stored on the computer readable medium and adapted to be executed by a processor to:
  - establish a first communication link between a customer computer and a telephone network switching center;
  - cause a telephone network switching center to establish a second communication link between the telephone network switching center and a merchant computer via an internet service provider and an internet;
  - cause the telephone network switching center to idle the second communication link;
  - cause the telephone network switching center to establish a third communication link between a credit processing center computer and one of the telephone network switching center and the internet service provider via a circuit switching network while the second communication link is idling;
  - determine whether the electronic transaction information is sensitive; and
  - control a switching function within the one of the telephone network switching center and the internet service provider to send the electronic transaction information from the customer computer via the first communication link to the merchant computer via the second communication link if the electronic transaction information is not sensitive; and
  - control the switching function within the one of the telephone network switching center to send the electronic transaction information from the customer computer via the first communication link to the credit processing center via the third communication link if the electronic transaction information is sensitive.

7. The system of claim 6, wherein the software is further adapted to be executed by the processor to determine whether the electronic transaction information is sensitive by determining whether the electronic transaction information is one of credit/debit card information and account access information.

8. The system of claim 6, wherein the software is further adapted to be executed by the processor to control the switching function within the one of the telephone network switching center and the internet service provider by controlling one of a conference calling function and an outbound dialing server switching function.

9. The system of claim 6, wherein the software is further adapted to establish the first communication link between the customer computer and the telephone network switching center by using a modem within the customer computer to establish the first communication link.

10. The system of claim 6, wherein the software is further adapted to be executed by the processor to establish a fourth communication link between the credit processing computer and a national credit clearing center computer.

11. A method of communicating electronic transaction information, comprising:
- communicating non-sensitive electronic transaction information between a customer computer and a merchant computer via a telephone network switching center, an internet service provider and an internet;
- communicating sensitive electronic transaction information between the customer computer and a credit processing computer via the telephone network switching center and a circuit switching network; and
- coupling a communication link associated with the customer computer to one of the internet and the circuit switching network by using a switching function within one of the internet service provider and the telephone network switching center while idling a communication link associated with one of the merchant computer and the credit processing computer.

12. The method of claim 11, wherein communicating the sensitive electronic transaction information between the customer computer and the credit processing computer includes communicating one of credit/debit card information and account access information.

13. The method of claim 11, wherein using the switching function within the one of the internet service provider and the telephone network switching center includes using one of a conference calling function and an outbound dialing server switching function.

14. A system for communicating electronic transaction information, comprising:
- a computer programmed to:
  - communicate non-sensitive electronic transaction information between the computer and a merchant computer via a telephone network switching center, an internet service provider and an internet;
  - communicate sensitive electronic transaction information between the computer and a credit processing computer via the telephone network switching center and a circuit switching network; and
  - cause a communication link associated with the computer to be coupled to one of the internet and the circuit switching network by using a switching function within one of the internet service provider and the telephone network switching center while idling a communication link associated with one of the merchant computer and the credit processing computer.

15. The system of claim 14, wherein the switching function is one of a conference calling function and an outbound dialing server switching function.

16. A method of communicating electronic transaction information, comprising:
- establishing a first communication link between a customer computer and a telephone network switching center;
- establishing a second communication link between the telephone network switching center and a merchant computer via an internet service provider and an internet;

generating non-sensitive electronic transaction information based on inputs from a user and information derived from the internet;

transmitting, via the first communication link, the non-sensitive electronic transaction information between the customer computer and the merchant computer;

idling the second communication link;

establishing a third communication link between a credit processing center computer and one of the telephone network switching center and the internet service provider via a circuit switching network while the second communication link is idling;

controlling a switching function within the one of the telephone network switching center and the internet service provider to send at some of the non-sensitive electronic transaction information from the customer computer via the first communication link to the merchant computer via the second communication link;

controlling the switching function within the one of the telephone network switching center and the internet service provider to send sensitive electronic transaction information from the customer computer via the first communication link to the credit processing center computer via the third communication link;

processing at least some of the sensitive electronic transaction information and at least some of the non-sensitive electronic transaction information to produce authorization information; and relaying the authorization information to the merchant computer via the customer computer.

* * * * *